US005475409A

United States Patent [19]

Simon et al.

[11] Patent Number: 5,475,409

[45] Date of Patent: Dec. 12, 1995

[54] ALIGNMENT STRUCTURE FOR COMPONENTS OF AN INK JET PRINT HEAD

[75] Inventors: Robert J. Simon, West Carrolton; Gary L. Strain, Brookville, both of Ohio

[73] Assignee: Scitex Digital Printing, Inc., Dayton, Ohio

[21] Appl. No.: 891,342

[22] Filed: May 29, 1992

[51] Int. Cl.[6] .................... G01D 18/00

[52] U.S. Cl. .................... 347/74; 347/90

[58] Field of Search .................... 347/73, 74, 75, 347/76, 77, 78, 90

[56] References Cited

U.S. PATENT DOCUMENTS

| | | | |
|---|---|---|---|
| 4,080,607 | 3/1978 | Van Breemen et al. | 347/74 |
| 4,277,790 | 7/1981 | Heibein et al. | 347/74 X |
| 4,550,320 | 10/1985 | Biser et al. | 347/77 |
| 4,672,390 | 6/1987 | Ishikawa | 347/74 |
| 4,879,565 | 11/1989 | Fujii | 347/74 |
| 5,115,251 | 5/1992 | Gray | 347/74 |

OTHER PUBLICATIONS

Commonly assigned U.S. Ser. No. 860,483.

*Primary Examiner*—Sandra L. Brase
*Attorney, Agent, or Firm*—Barbara Joan Haushalter

[57] ABSTRACT

An apparatus and method allows for mounting and aligning of the charge plate/catcher assembly and the droplet generator and has six degrees of freedom of adjustment, including three degrees of freedom of translation and three degrees of freedom of rotation. A first degree of freedom of translation comprises a height adjustment of the resonator relative to the charge plate; a second degree of freedom of translation comprises an alignment adjustment for aligning the plurality of jets with respect to the plurality of charge leads; and a third degree of freedom of translation comprises a reciprocal adjustment for moving the plurality of jets relative to the charge plate. Additionally, a first degree of freedom of rotation comprises a first parallel adjustment for aligning the plurality of jets parallel to the charge plate face; a second degree of freedom of rotation comprises a second parallel adjustment for aligning the array of orifices parallel to the charge plate face; and a third degree of freedom of rotation comprises a third parallel adjustment for aligning the orifice plate parallel to the top of the charge leads. The present invention also provides for a strain relief to insure an electrical contact to control leads associated with charge leads.

23 Claims, 4 Drawing Sheets

ALIGNMENT STRUCTURE FOR COMPONENTS OF AN INK JET PRINT HEAD

TECHNICAL FIELD

The present invention relates to continuous ink jet printers and, more particularly, to mounting and aligning a drop generator and catcher assembly in an ink-jet print head.

BACKGROUND ART

Ink jet printing systems are known in which a print head defines one or more rows of orifices which receive an electrically conductive recording fluid, such as for instance a water base ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

An existing assembly method for assembling the components of an ink jet print head includes locating the droplet generator with the aid of an assembly fixture, then using an epoxy or other adhesive to fasten it into place. The charge plate/catcher assembly was then aligned to the droplet generator through the use of external adjustment fixtures. Once a proper alignment was achieved, the charge plate/catcher assembly was fastened with screws to the common frame holding the droplet generator.

Unfortunately, use of epoxy in existing assembly and alignment methods has had some drawbacks. For instance, the use of adhesive increases assembly cycle time, since it takes several hours for the adhesive to cure. The use of epoxy is also problematic in that epoxy is temperature and humidity sensitive. Finally, the sensitivity of the alignment is such that the final fastening of charge plate/catcher assembly once alignment is achieved can and does alter the alignment, requiring a realignment.

In order to overcome the problems associated with using an epoxy, a mechanical structure for mounting and aligning components of an ink jet printer is disclosed in co-pending, commonly assigned U.S. patent application Ser. No. 860,483. The co-pending application provides a means for mounting and aligning the drop charging and deflected drop collector and the droplet generator of an ink jet print head, within a frame structure for holding the two components. The precise positioning of the alignment is achieved by incorporating three degrees of freedom of adjustment into the frame which are self-locking. Unfortunately, the location of screws for in/out adjustment is located behind the resonator, which is extremely difficult for the operator during the adjustment operation. Since the z height adjustment controls the filament length breakoff location relative to the charging leads, lack of assembly consistency in the location of the charge plate relative to the catcher mounting surface requires matching resonators to charge plates, instead of having a universal setting. Finally, scaling up from the flex assembly would create a print head of excessive size.

It is seen then that there is a need for an apparatus for mounting and alignment components of an ink jet print head which overcomes the problems associated with existing techniques.

SUMMARY OF THE INVENTION

This need is met by the system according to the present invention, wherein a means is provided for mounting and aligning the resonator and the catcher assembly with a mechanical holding means. These two elements must be precisely positioned relative to each other in order to ensure ink-jet imaging. The preciseness of this alignment is beyond acceptable machining tolerances that would permit mechanically fastening two elements in a frame with no further adjustment.

In accordance with one aspect of the present invention, a mounting and alignment apparatus for a continuous ink jet printer having a jet array comprises six degrees of freedom of adjustment, including three degrees of freedom of translation and three degrees of freedom of rotation. The first degree of freedom of translation comprises a height adjustment of the resonator relative to the charge plate; the second degree of freedom of translation comprises an alignment adjustment for aligning the plurality of jets with respect to the plurality of charge leads; and the third degree of freedom of translation comprises a reciprocal adjustment for moving the plurality of jets relative to the charge plate. In the apparatus of the present invention, the first degree of freedom of rotation comprises a first parallel adjustment for aligning the plurality of jets parallel to the charge plate face; the second degree of freedom of rotation comprises a second parallel adjustment for aligning the array of orifices parallel to the charge plate face; and the third degree of freedom of rotation comprises a third parallel adjustment for aligning the orifice plate parallel to the top of the charge leads.

The present invention also provides for a strain relief which provides a mechanical means to insure an electrical contact to control leads associated with charge leads. The electrical contact is accomplished using anisotropic epoxy. The mechanical means, which protects cable connections of the ink jet printer, comprises a catcher assembly. The mechanical means further comprises clamp means, wherein a first end of the clamp means is attached to the catcher assembly and a second end of the clamp means is restrained in a vertical plane by a frame. Finally, the mechanical means comprises a compressible layer situated between the catcher assembly and the clamp means to hold the cable connections in a desired position.

The flexure allowed by the combination of an epoxy or anisotropic bond and a mechanical holding means provides a variety of advantages. First, the flexure allows one component to be replaced without destroying the entire structure. This is advantageous both for initial assembly and for replacement or repair of failed components. Other objects and advantages of the invention will be apparent from the following description, the accompanying drawings and the appended claims.

DETAILED DESCRIPTION OF THE PREFERRED EMBODIMENTS

The present invention provides a means for mounting and aligning two components, including (1) the drop charging and deflected drop collector and (2) the droplet generator of an ink jet print head. The precise positioning of the alignment is achieved using a mechanical holding means.

The mounting and alignment apparatus of the present invention comprises six degrees of freedom of adjustment, which will be described in more detail below, The degrees of freedom include first, second, and third degrees of freedom of translation; and first, second, and third degrees of freedom of rotation. The first degree of freedom of translation comprises a height adjustment of resonator relative to a charge plate. The second degree of freedom of translation comprises an alignment adjustment for aligning each of the plurality of jets with respect to each of the plurality of charge leads. The third degree of freedom of translation comprises a reciprocal adjustment for moving the plurality of jets relative to the plurality of charge leads. With respect to the degrees of freedom of rotation, the first degree of freedom of rotation comprises a first parallel adjustment for aligning the plurality of jets parallel to the charge plate face; the second degree of freedom of rotation comprises a second parallel adjustment for aligning the array of orifices parallel to the charge plate face; and the third degree of freedom of rotation comprises a third parallel adjustment for aligning the orifice plate parallel to the top of the charge leads.

Figure 1:
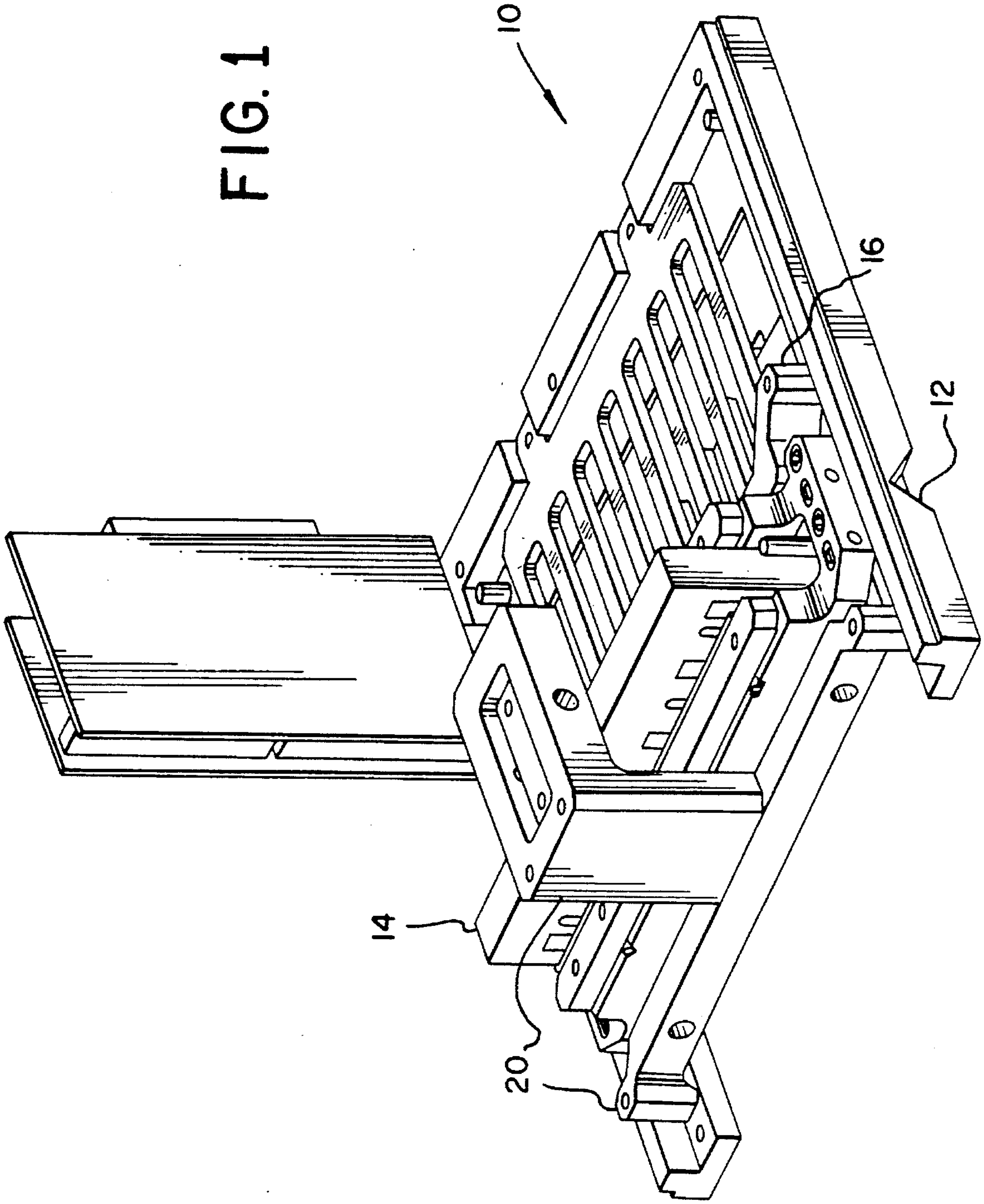
FIG. 1 is an assembled isometric view of the principal assemblies which are aligned and the removable alignment frame.

Referring now to the drawings, in FIG. 1 an isometric view of the principal components for the six-degrees-of-freedom adjustment assembly used in an ink jet printer is illustrated. A catcher/charge plate assembly 10 is fixed in an alignment stand by a V-groove 12 in the catcher/charge plate assembly 10. This assembly 10 provides charging and collecting means for controlling droplet streams generated by a droplet generator assembly 14. The catcher/charge plate assembly 10 incorporates a fixed rear frame 16 which provides a spring bias at location 18 against a removable first adjustment frame 20, which allows for physical adjustments. The rear frame 16, also designated the second frame, provides a spring bias for the physical adjustments, and further provides a clamp force. The drop generator assembly 14, then, is situated between the first frame 20 and the second frame 16.

Figure 2:
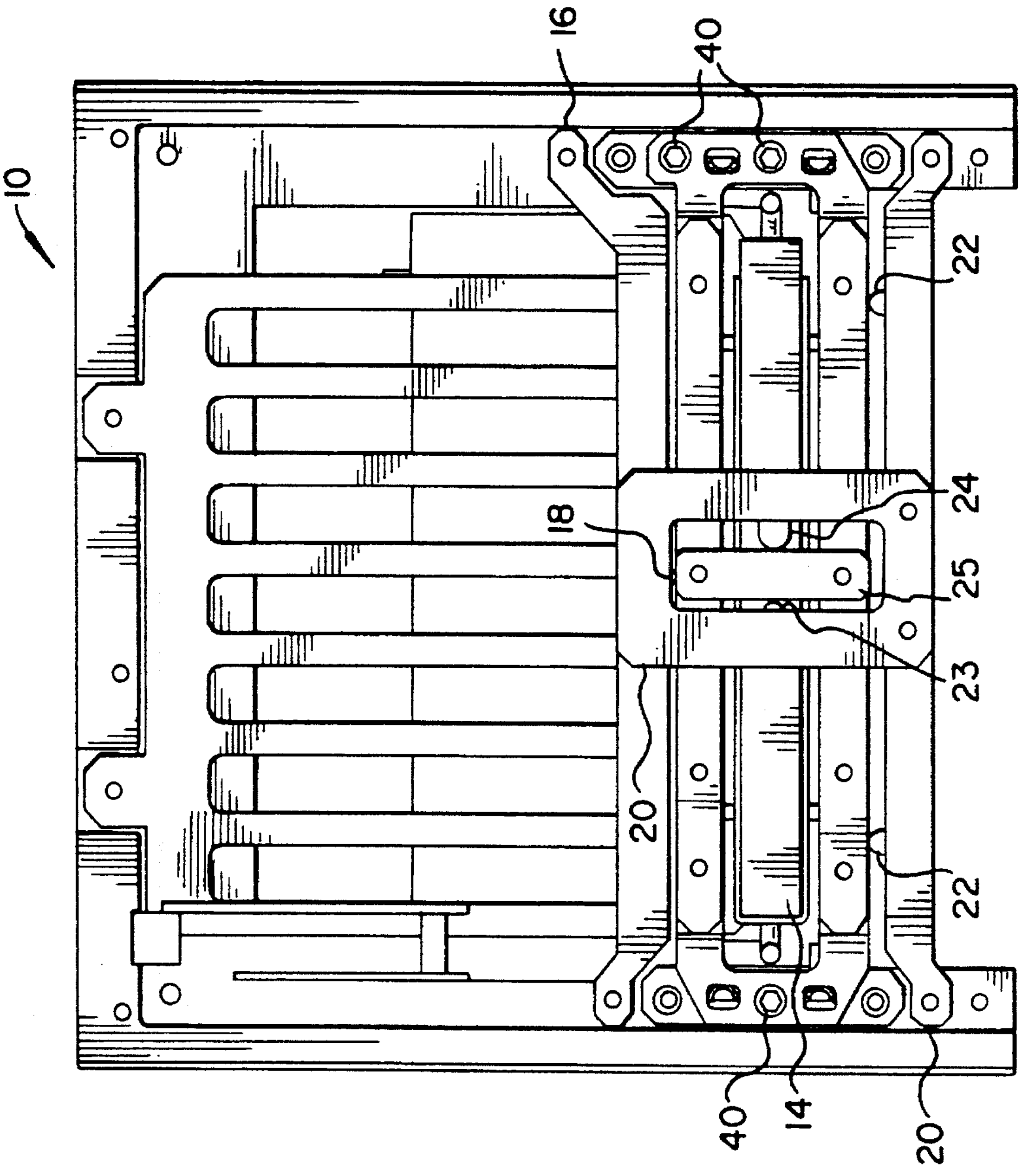
FIG. 2 is an assembled top view of the alignment of the droplet generator and catcher assemblies in the aligned and locked positions.

Referring now to FIG. 2 and continuing with FIG. 1, a top view which demonstrates the principle adjustments between the catcher/charge plate assembly 10 and the droplet generator assembly 14 is shown. The spring bias at location 18 provides compressive force on the droplet generator assembly 14 against precision adjustment screws 22, preferably 120 tpi. This coupling provides a method for moving the droplet array generated by the droplet generator assembly 14 toward and away from the charge lead array, thereby providing the third degree of freedom of translation for the mounting and alignment apparatus of the present invention. The third degree of freedom of translation comprises a reciprocal adjustment for moving the plurality of jets relative to the plurality of charge leads. This coupling also allows an operator to rotate the droplet generator assembly 14 array until it is parallel to the face of the catcher/charge plate assembly 10 lead array, thereby providing for the second degree of freedom of rotation, which comprises a second parallel adjustment for aligning the array of orifices parallel to the charge plate face.

Continuing with FIG. 2, a similar spring bias and screw combination is accomplished with the spring 23 and the screw 24. This causes the components of FIGS. 1 and 2 to be loaded against a barrier which is permanently attached to the droplet generator assembly 14. This portion of the assembly of the present invention provides a translation means for positioning each of the plurality of droplets relative to the plurality of charge leads. This portion of the assembly, along with a member 25 for translation, provide the second degree of freedom of translation. The second degree of freedom of translation comprises an alignment adjustment for aligning each of the plurality of jets with respect to each of the plurality of charge leads.

Figure 3:
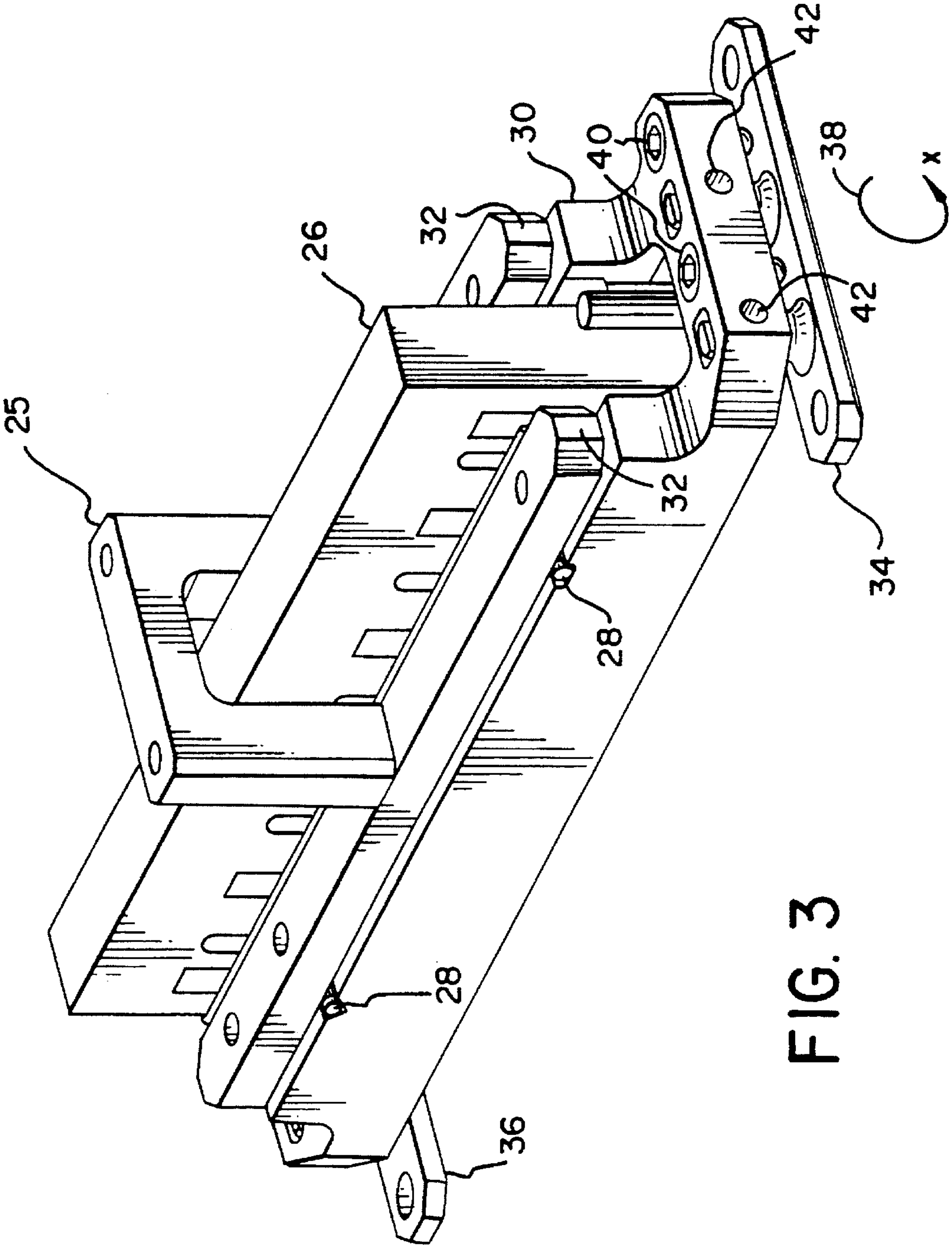
FIG. 3 is an isometric view of the resonator assembly showing adjustments used to fix two rotations and one translation.

The remaining first and second degrees of freedom of rotation and the first degree of freedom of translation of the droplet generator assembly 14 will now be described. These remaining degrees of freedom of adjustment are accomplished by a preliminary setup of the droplet generator assembly 14, which is best illustrated in FIG. 3. The droplet generator assembly 14 comprises a drop generator 26 with dowel pins 28 used to mount into a lower frame 30. Clamp bars 32 are used to fix the drop generator 26 to the lower frame 30. The lower frame 30 couples to a first base support 34 and a second base support 36. The bottom surfaces of the base supports 34 and 36 rest directly on the catcher/charge plate assembly 10 of FIGS. 1 and 2. The height of the resonator 26, the parallelism for aligning the plurality of jets relative to the charge plate face, the parallelism for aligning the orifice plate parallel to the top of the charge leads, and the rotation or the plurality of jets about the x-axis indicated by rotation arrow 38, are obtained by adjusting precision screws 40, best illustrated in FIG. 2. The height adjustment of the resonator 26 relative to the charge plate of assembly 10 provides the first degree of freedom of translation. The first parallel adjustment for aligning the plurality of jets parallel to the charge plate face provides the first degree of freedom of rotation. The third parallel adjustment for aligning the orifice plate parallel to the top of the charge leads provides the third degree of freedom of rotation.

Figure 4:
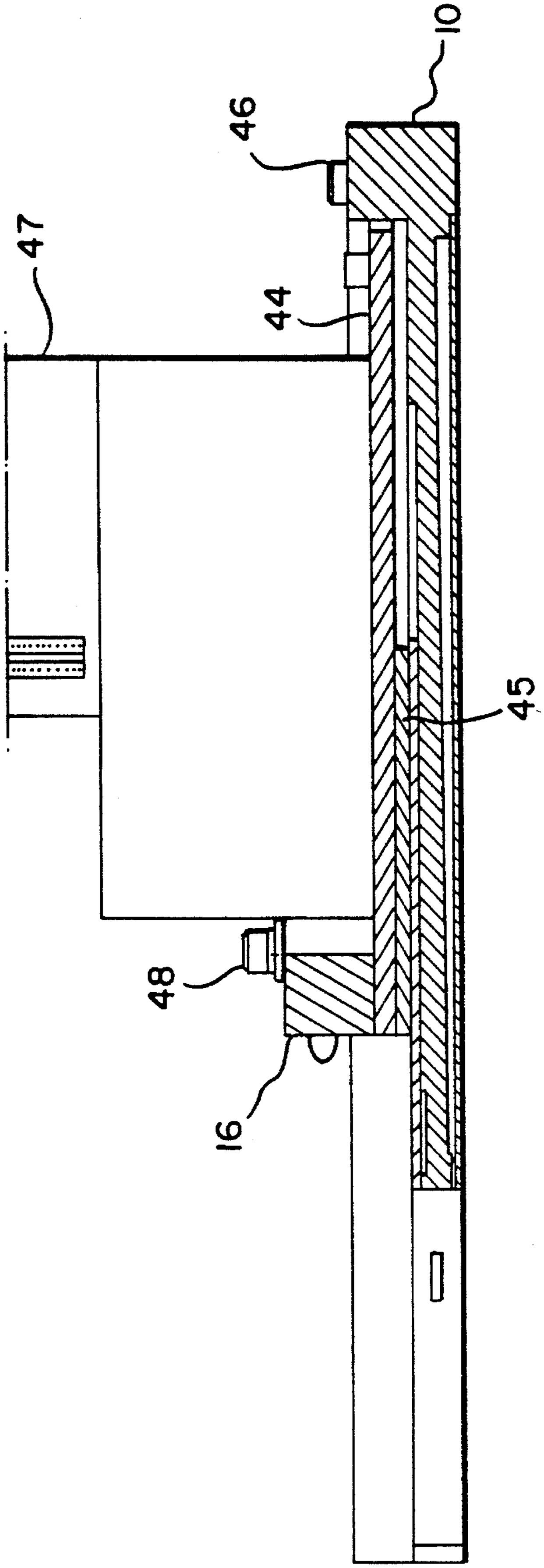
FIG. 4 is a section view through the catcher/charge plate assembly showing the flex cables, strain relief, and alignment spring load.

Once the nominal positions for the drop generator 26 are achieved using a fixture or a coordinate measuring system, the drop generator 26 is locked into place using set screws 42, and corresponding screws (not shown) on the opposing side of the frame 30. Referring now to FIG. 4, there is illustrated a section view through the catcher/charge plate assembly 10. As shown in FIG. 4, the lower frame 30 is a second permanent frame and provides the spring bias for critical alignment parameters. The lower frame 30 also constrains a compression member 44 which is attached to a low durometer compressive material 45 which provides a clamping force on cables from charge driver boards 47. The cables provide charging signals to the plurality of charge leads fixed to the catcher assembly 10. The compression member 44 is constrained from motion by affixing the compression member 44 to the catcher assembly 10 at location 46, and fixing the lower frame 30 to the catcher assembly 10 at location 48.

Although the preferred mode of practicing the invention has been described with reference to an ink jet print head for a continuous ink jet printer, the principle of the present invention can also be applied to a wide variety of ink jet printers.

INDUSTRIAL APPLICABILITY AND ADVANTAGES

The mounting and alignment apparatus according to the present invention is useful in continuous ink jet printers. The mounting and alignment apparatus of the present invention provides for adjustment by height and tilt of the resonator structure to precisely control the tilt of the resonator relative to the charge plate, thereby providing consistent print windows. The present invention provides the further advantage of allowing height changes to accommodate a wider range of charge plate flatness coplanarity. Finally, the present invention provides the advantage of easily compensating for changes in ink which may have difficult filament break-off centers.

Having described the invention in detail and by reference to the preferred embodiment thereof, it will be apparent that other modifications and variations are possible without departing from the scope of the invention defined in the appended claims.

We claim:

1. A method of aligning components of an ink jet printer having a resonator and a catcher/charge plate assembly, comprising the steps of:

a. fixing the catcher/charge plate assembly in a fixed position;

b. moving the resonator with respect to the catcher/charge plate assembly to align the resonator with respect to the catcher/charge plate assembly; and c. fixing the resonator in an aligned position relative to the catcher/charge plate assembly by securing the resonator to the catcher/charge plate assembly.

2. A method of aligning components of an ink jet printer as claimed in claim 1 wherein the step of fixing the catcher comprises the step of securing the catcher/charge plate assembly in a fixed position.

3. A method of aligning components of an ink jet printer as claimed in claim 1 wherein the step of moving the resonator with respect to the catcher/charge plate assembly comprises the step of providing six degrees of freedom of adjustment.

4. A mounting and alignment apparatus for a continuous ink jet printer having a jet array including a plurality of jets, and a plurality of charge leads associated with a charge plate, comprising:

a. a first frame operating as a front temporary alignment means for allowing physical adjustments;

b. a second frame for providing a spring bias for the physical adjustments, and further for providing a clamp force; and c. a drop generator assembly situated between the first frame and the second frame.

5. A mounting and alignment apparatus as claimed in claim 4 wherein the second frame comprises a rear permanent alignment means.

6. A mounting and alignment apparatus as claimed in claim 4 wherein the spring bias provides a reciprocal adjustment for moving the plurality of jets relative to the charge plate and a first parallel adjustment for aligning the plurality of jets parallel to the charge plate face.

7. A mounting and alignment apparatus as claimed in claim 4 wherein the clamp force provides a strain relief.

8. A mounting and alignment apparatus as claimed in claim 7 wherein the strain relief provides a mechanical means to insure an electrical contact to a plurality of control leads associated with the plurality of charge leads.

9. A mounting and alignment apparatus as claimed in claim 8 wherein the electrical contact is accomplished using anisotropic epoxy.

10. A mounting and alignment apparatus as claimed in claim 8 wherein the mechanical means comprises means for protecting cable connections of the ink jet printer.

11. A mounting and alignment apparatus as claimed in claim 10 wherein the mechanical means for protecting cable connections, comprises:

a. a catcher assembly;

b. the clamp means, wherein a first end of the clamp means is attached to the catcher assembly and a second end of the clamp means is restrained in a vertical plane by the second frame; and c. a compressible layer situated between the catcher assembly and the clamp means to hold the cable connections in a desired position.

12. A mounting and alignment apparatus as claimed in claim 11 wherein the compressible layer comprises silicone sponge rubber having a shore A Durometer of approximately five.

13. A mounting and alignment apparatus for a continuous ink jet printer having a jet array including a plurality of jets, and a plurality of charge leads associated with a charge plate, and further having a drop charging and deflected drop collector and a resonator, and an orifice plate with an array of orifices, the apparatus comprising:

a. a first degree of freedom of translation;

b. a second degree of freedom of translation;

c. a third degree of freedom of translation;

d. a first degree of freedom of rotation;

e. a second degree of freedom of rotation; and f. a third degree of freedom of rotation.

14. A mounting and alignment apparatus as claimed in claim 13 wherein the first degree of freedom of translation comprises a height adjustment of the resonator relative to the charge plate.

15. A mounting and alignment apparatus as claimed in claim 13 wherein the second degree of freedom of translation comprises an alignment adjustment for aligning each of the plurality of jets with respect to each of the plurality of charge leads.

16. A mounting and alignment apparatus as claimed in claim 13 wherein the third degree of freedom of translation comprises a reciprocal adjustment for moving the plurality of jets relative to the plurality of charge leads.

17. A mounting and alignment apparatus as claimed in claim 13 wherein the first degree of freedom of rotation comprises a first parallel adjustment for aligning the plurality of jets parallel to the charge plate face.

18. A mounting and alignment apparatus as claimed in claim 13 wherein the second degree of freedom of rotation comprises a second parallel adjustment for aligning the array of orifices parallel to the charge plate face.

19. A mounting and alignment apparatus as claimed in claim 13 wherein the third degree of freedom of rotation comprises a third parallel adjustment for aligning the orifice plate parallel to the top of the charge leads.

20. A mounting and alignment apparatus as claimed in claim 13 further comprising compression means.

21. A mounting and alignment apparatus as claimed in claim 20, wherein the flexure means provides flexibility in the structure.

22. A mounting and alignment apparatus as claimed in claim 20, wherein the flexure means prevents rotation of movement of a part perpendicular to a plane of movement.

23. A method of mounting and aligning a drop charging and deflected drop collector and a droplet generator of an ink jet printer, within a frame, the printer having a catcher and further having a jet array including a plurality of jets, and a plurality of charge leads, the method comprising the steps of:

a. adjusting a height of the droplet generator;

b. tilting the droplet generator outward to improve charging;

c. securing the droplet generator to the catcher; and d. performing secondary adjustments to complete alignment of the drop charging and deflected drop collector and the droplet generator.

* * * * *